[19] 3,697,867
Kleesattel [45] Oct. 10, 1972

[54] VIBRATION SENSOR UTILIZING EDDY CURRENTS INDUCED IN MEMBER VIBRATING IN THE FIELD OF A MAGNET

[72] Inventor: Claus Kleesattel, Forest Hills, N.Y.
[73] Assignee: Cavitron Corporation, Long Island City, N.Y.
[22] Filed: June 19, 1969
[21] Appl. No.: 834,720

[52] U.S. Cl. ..................324/40, 73/67, 73/70, 73/71.4
[51] Int. Cl. ...................................G01r 33/00
[58] Field of Search ..........324/34, 40; 73/67, 70, 69, 73/70.1, 71.4; 181/0.5 AP

[56] References Cited

UNITED STATES PATENTS

| 2,460,115 | 1/1949 | Adamson | 73/70.1 |
| 2,706,805 | 4/1955 | Clewell | 324/164 |
| 3,268,805 | 8/1966 | Normando | 324/40 |

FOREIGN PATENTS OR APPLICATIONS

| 781,363 | 8/1957 | Great Britain | 324/174 |
| 157,515 | 1963 | U.S.S.R. | 324/40 |
| 576,275 | 3/1946 | Great Britain | 73/70.1 |

*Primary Examiner*—Rudolph V. Rolinec
*Assistant Examiner*—R. J. Corcoran
*Attorney*—Philip Sperber

[57] ABSTRACT

Eddy current devices are used to measure the amplitude and/or direction of various components of a vibrating body as a result of an acoustic signal applied thereto. These devices are also used to measure the power transmitted by said acoustic signal to a load which is coupled to the vibrating body.

19 Claims, 10 Drawing Figures

INVENTOR.
Claus Kleesattel
BY
ATTORNEY

VIBRATION SENSOR UTILIZING EDDY CURRENTS INDUCED IN MEMBER VIBRATING IN THE FIELD OF A MAGNET

BACKGROUND OF THE INVENTION

The present invention relates to amplitude measuring devices for detecting various components of the surface motion of a body resonating as a result of an acoustic signal applied thereto. More particularly, this invention relates to improved configurations of eddy current devices which sense tangential and normal components of motion. These devices may be used as a mechanical wattmeter to measure transmitted acoustic power and they may also be used as a direction finder and a vector probe. The word "vibrating" shall be used hereinafter as equivalent to "resonating" whereby a standing wave is set up within the resonating or vibrating body.

The basic principle underlying the operation of the devices of this invention is that alternating currents are induced on the surface of a conducting body as the body resonates or vibrates within a constant magnetic field supplied by a polarizing magnet. These self-induced currents are commonly referred to as eddy currents. The alternating magnetic field generated by these eddy currents may be detected by a coil which is positioned contiguous to a small area of the surface of the moving body. This coil will be hereinafter referred to as the pickup coil. This invention is concerned with the particular configuration of the pickup coil, its core if there be one, the polarizing magnet, and the way such configurations may be used to measure amplitudes of motion, directions of motion, phase differences, and transmitted power.

In general, the surface of any resonating or vibrating body may be considered to have three Orthogonal components of motion. Motions which are parallel to the surface will be hereinafter referred to as the tangential components of motion, since they are tangential to the surface, and motions which are perpendicular to the surface will be hereinafter referred to as the normal components of motion, since they are normal to the surface. In the case of a cylindrical elongated bar having a longitudinal axis, the tangential component along the elongated surface may also be referred to as the axial component and the normal component along the elongated surface may be referred to as the radial component. Even though such a body is generally driven by an acoustic signal in the direction of the longitudinal axis, motion also occurs in a direction transverse to the longitudinal axis, primarily due to Poisson's effect.

Presently, in the prior art, there are several configurations of eddy current devices. However, these known configurations are not entirely satisfactory. One known device is schematically shown in FIG. 1 on Page 239 of the October 1967 issue of ULTRASONICS. The main disadvantage of such a device is that it is a bipolar device in that it detects the eddy current at two separate points along the surface of the body. This is especially undesirable where the tangential component of motion is not uniform along an appreciable length of the vibrating surface, which is a greater problem at higher frequencies.

Another known device is shown on FIG. 1 on Page 104 of the ACOUSTICAL JOURNAL (Russian). Volume VII, Number 1, 1961. This article discloses a device being used to measure tangential motion. However, due to the position of the polarizing magnet (5), the magnetic field at the surface of the bar has both a radial and an axial component. Therefore, this device will concurrently measure the normal and tangential components of motion. Hence, the reading from such a device will be difficult to interpret, since there is no way to differentiate between the normal and tangential components. Also, due to the configuration and position of the magnet, the device is limited to being used at the end of a vibrating body.

SUMMARY OF THE INVENTION

While the devices of the present invention may be used for measuring the amplitude of any vibrating body, they are particularly useful for measuring the vibrations of a body vibrating at a high frequency, such as an ultrasonic frequency. A device in accordance with this invention measures the tangential and/or normal components of motion of the vibrating body, depending upon which embodiment is chosen. This device can then be placed anywhere along the length of the vibrating body contiguous to a small area of the body surface to accurately describe the motion being analyzed. It is important that the sensing coil be limited to a small area so that the accuracy and sensitivity of the device is maximized. A small area is defined to include a length in the direction of wave propagation of about one-tenth of a wavelength. In the case of a device which independently and simultaneously measures both the tangential and the normal components of motion that exist when a longitudinal wave is transmitted along a bar, the device can be used as a mechanical wattmeter to indicate the amount of power being transmitted. Two devices, each one of which measures only one component of motion, can also be used to measure mechanical power being transmitted through a body. The devices of this invention can also be employed as a direction finder and as a vector probe.

Therefore, the primary object of the present invention is to provide eddy current pickup devices which accurately and independently measure the tangential and/or normal components of motion of a vibrating body.

Another object of this invention is to provide an improved eddy current pickup device which accurately senses the tangential component of motion of a vibrating body.

Another object of this invention is to provide an eddy current pickup device which accurately senses the normal component of motion of a vibrating body.

A still further object of the present invention is to provide a power indicating device for measuring the power transmitted along a vibrating body coupled to a dissipative load, said power indicating device comprising an eddy current pickup device which simultaneously and independently measures the tangential and normal components of motion.

A still further object of this invention is to provide a device utilizing pickup coils to determine the orientation of an amplitude vector and to measure the phase difference between the individual vector components.

Briefly, one aspect of the present invention includes the use of a coil of wire wound around a vibrating body (circumferentially in the case of a cylindrical vibrating body) with a polarizing magnet surrounding the coil of wire (radially magnetized in the case of a cylindrical vibrating body). This type of device will sense the axial components of motion along the surface of the cylindrically vibrating body.

Another aspect of the present invention comprises a ferrite cube around which is wound at least one coil of wire. This cube with one or more coils of wire wound thereabout is positioned contiguous to the vibrating body. The cube may be permanently magnetized, or the coils may carry a d.c. bias current, or a polarizing magnet may be used in order to supply a constant magnetic flux to the surface of the body. The type of motion which is measured depends upon the faces of the ferrite cube about which the coil of wire is wound. The axis of the coil of wire must be parallel to the component of motion which is being measured. Such a device can be used to measure normal components of motion and/or tangential components of motion, said components being caused by either axial, radial or torsional modes of vibration. Also, by using two coils of wire, each one wound so as to measure the tangential and normal components respectively, the device can be used as a single point mechanical wattmeter to calculate the amount of energy being transmitted by the vibrating body to a dissipative load.

Another aspect of the present invention is the positioning of two devices which measure tangential components, one at the point of maximum tangential displacement and the other at the point of minimum tangential displacement. From the two readings obtained, the power transmitted to a dissipative load is calculated.

Another aspect of the present invention is the positioning of two devices which measure normal components, one at the point of maximum normal displacement and the other at the point of minimum normal displacement. From the two readings obtained, the power transmitted to a dissipative load is calculated.

BRIEF DESCRIPTION OF THE DRAWINGS

For a better understanding of the invention, reference may be made to the following description of exemplary embodiments, taken in conjunction with the figures of the accompanying drawings, in which.

DESCRIPTION OF EXEMPLARY EMBODIMENTS

Figure 1:
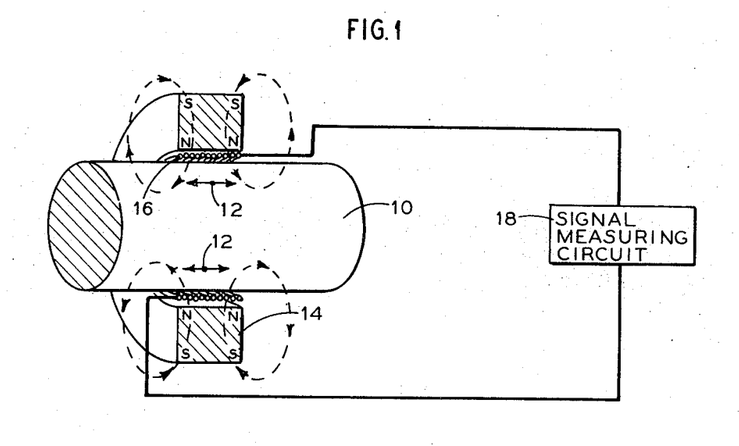
FIG. 1 is schematic representation of an improved device for measuring tangential components of motion.

Referring to FIG. 1, a cylindrical conductive bar 10, or a bar having at least a conductive surface, vibrated along its longitudinal axis, has a tangential component of motion as indicated by the double headed arrow 12. The eddy current pickup device is schematically shown to include a polarizing magnet 14 which is in the form of a ring or toroid and radially (relative to the axis of the bar) polarized as shown. Of course, if the bar does not have a cylindrical shape, then the polarizing magnet would ideally have to be shaped so that there will be a uniform air gap between the vibrating body and magnet with some space for a pickup coil. In other words, the shape of the polarizing magnet should conform to the entire periphery or circumference of the vibrating bar. A pickup coil 16 of wire is contiguous to the surface of the bar 10 and positioned between the polarizing magnet 14 and the bar 10. The coil 16 should be limited to a small area. For instance, the length of the coil along the longitudinal axis of the bar should preferably be less than one-tenth of a wavelength of the excitation frequency. The polarizing magnet 14 produces lines of flux essentially perpendicular to the surface of the 10, as indicated by the dotted lines. Since eddy currents result from a cross product of the flux vector with the motion vector which is perpendicular to the flux vector, this embodiment will primarily sense tangential components of motion. The voltage induced in the pickup coil 16 by the circumferential eddy currents on the surface of the bar 10 is directly proportional to the amount of displacement due to the motion 12. The pickup coil 16 is connected to a conventional signal measuring circuit 18. The induced voltages related to the normal components of motion and flux components perpendicular thereto will cancel each other.

Preferably, the polarizing magnet in this embodiment, as well as in all of the other embodiments of this invention, is nonconductive. The magnet may be either split up in segments, powdered or made of a ferritic material. The nonconductive nature of the magnet makes it possible to position the magnet as close as possible to the pickup coil without having the magnetic material interfere with the eddy current fields. The advantages of using a ferrite core throughout all of the embodiments are that in addition to being nonconductive, it also has a relatively high permeability which is advantageous as far as the detection of the weak alternating flux of eddy currents is concerned. This is especially true for pickup devices like those illustrated in FIGS. 3, 4, 5, 6, 7, 9 and 10.

Figure 1A:
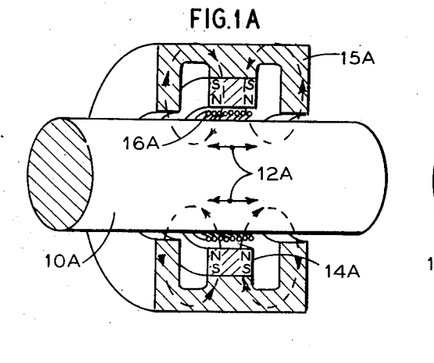
FIG. 1A is an alternative embodiment of the device shown in FIG. 1.
Figure 1B:
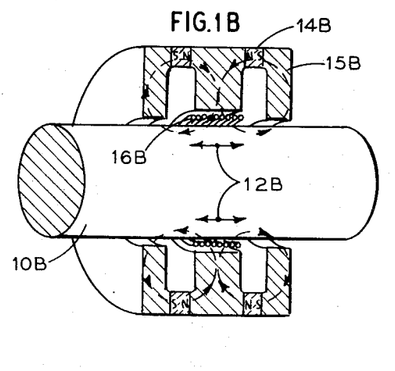
FIG. 1B is another embodiment of the device shown in FIG. 1.

FIGS. 1A and 1B are alternative embodiments of FIG. 1. The component parts of the devices shown in FIGS. 1A and 1B are numbered with an appropriate sub-letter using the same numeral as used in FIG. 1. However, in FIGS. 1A and 1B there are pole pieces 15A and 15B respectively, the purpose of which is to supplement the flux path of the magnetic field created by the polarizing magnets 14A and 14B. There are also signal measuring circuits associated with FIGS. 1A and 1B which are not shown. With respect to FIGS. 1, 1A and 1B, it is well recognized that the magnets 14, 14A and 14B could be replaced by coils of wire to create the polarizing field.

The configurations of FIGS. 1, 1A and 1B are an improvement over the prior art for several important reasons. First of all, these pickup devices will only sense the tangential component of motion of the vibrating bars 10, 10A and 10B. The normal components of motion, which would be in radial direction for the embodiment shown, would not be sensed. This is because there is a cancelling effect when the cross-product of the rightward component of the flux lines of the polarizing magnet 14, 14A and 14B with the normal component of motion is considered in conjunction with the cross-product of the leftward component of the flux lines of the polarizing magnet 14 with the normal component of motion. Secondly, these devices can be positioned anywhere along the length of a vibrating body. Thirdly, due to the particular configuration, the magnetic field and sensing coil of wire may be limited to a much narrower area of the vibrating body than the prior art. Hence, these devices can be more accurate, particularly at higher frequencies.

Figure 2:
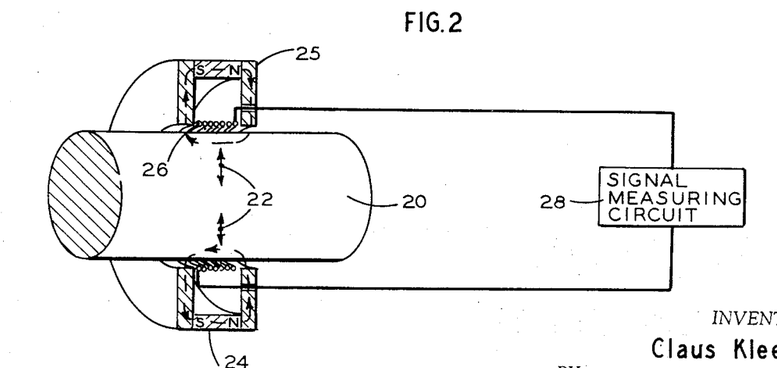
FIG. 2 is a schematic representation of a device for measuring normal components of motion.

Referring to FIG. 2, a cylindrical bar 20 vibrated along its longitudinal axis, has a normal component of motion as indicated by the double headed arrow 22. This component of motion is due to the Poisson effect. The eddy current pickup device is schematically shown to include a polarizing magnet 24, toroidally shaped and polarized as shown. The flux path is completed by the use of pole plates 25-25. A pickup coil 26 is contiguous to the surface of the bar 20 and positioned within the pole-plates 25—25. The polarizing magnet 24 produces lines of flux essentially parallel to the bar 20, as indicated by the dotted lines. Since eddy currents result from a cross product of the flux vector with the motion vector which is perpendicular to the flux vector, this embodiment will primarily sense normal components of motion. The voltage induced in pickup coil 26 by the eddy currents on the surface of the bar 20 is directly proportional to the amount of displacement due to the motion 22. The pickup coil 26 is connected to a conventional signal measuring circuit 28. The polarizing means could also be similar to that shown in FIG. 1, except that the magnetization at the polarizing magnet would be in a longitudinal or axial direction. Also, the polarizing means could be an additional coil wound concentrically outside of the pickup coil 26 with a direct current bias applied to said additional coil.

Figure 3:
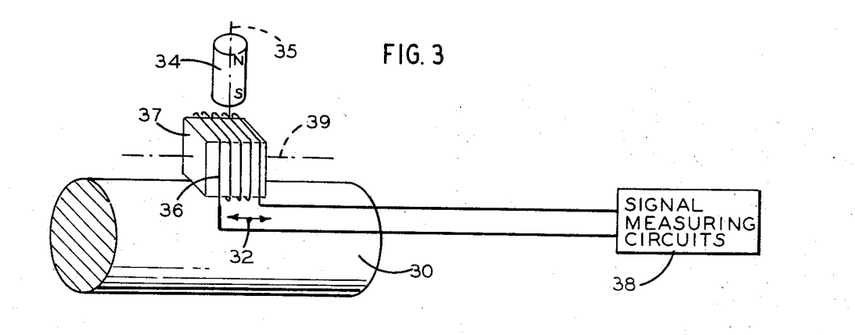
FIG. 3 is a schematic representation of another improved device for measuring tangential components of motion.

Referring to FIG. 3, a cylindrical bar 30 vibrated along its longitudinal axis, has a tangential component of motion as indicated by the double headed arrow 32. The eddy current pickup device is schematically shown to include a polarizing magnet 34, polarized as shown and having an axis 35 which is perpendicular to the longitudinal axis of the bar 30, and a pickup coil 36 which is wound around a ferrite core 37 as shown. The ferrite core 37 is positioned contiguous to the surface of the bar 30. The voltage induced in the pickup coil 36 by the eddy currents on the surface of the bar 30 is directly proportional to the amount of displacement due to the motion 32. The pickup coil 36 is connected to a conventional signal measuring circuit 38. In order for the device of FIG. 3 to sense the entire tangential component of motion 32, it is necessary that the magnetic axis 39 of the coil of wire 36 be parallel to the component of motion being measured. This type of pickup device may be used to detect the exact direction of tangential motion. Since the zero point is very sharp, it can be utilized for exact determination of the direction of maximum tangential motion. The ferrite core 37 is rotated about an axis parallel to the axis 35 of the polarizing magnet 34 until the signal becomes zero. Then it is known that the direction of maximum tangential motion coincides with the plane of the coil of wires 36. Hence, this device can used as a direction finder as well as an amplitude measuring device.

Figure 4:
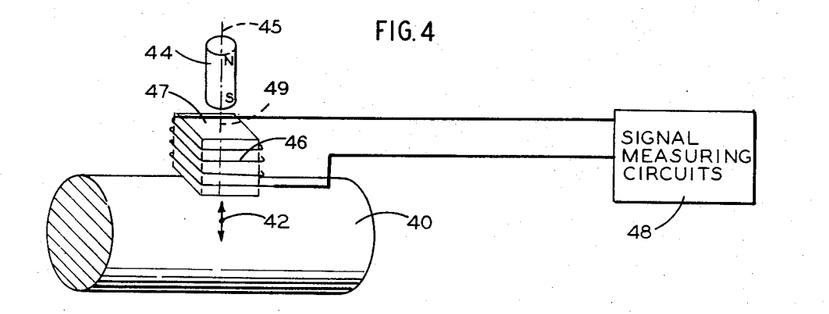
FIG. 4 is a schematic representation of another device for measuring normal components of motion.

Referring to FIG. 4, a cylindrical bar 40 vibrated along its longitudinal axis, has a normal component of motion as indicated by the double headed arrow 42. This component of motion is due to the Poisson effect. The eddy current device is schematically shown to include a polarizing magnet 44, polarized as shown and having an axis 45 which is perpendicular to the longitudinal axis of the bar 40, and a pickup coil 46 which is wound around a ferrite core 47 as shown. The ferrite core 47 is positioned contiguous to the to the surface of the bar 40. The voltage induced in pickup coil 46 by the eddy currents on the surface of the bar 40 is directly proportional to the amount of displacement due to the motion 42. The pickup coil 46 is connected to a conventional signal measuring circuit 48. This device is similar to the device shown in FIG. 3 except that the coil of wire 46 is wound in a different manner and is used to sense the normal component of motion. In order for this device to sense the entire normal component of motion 42, it is necessary that the magnetic axis 49 of the coil of wire 46 be parallel to the normal component of motion. This device could also be placed at the end face of a bar to sense the normal component of motion on that surface.

Figure 5:
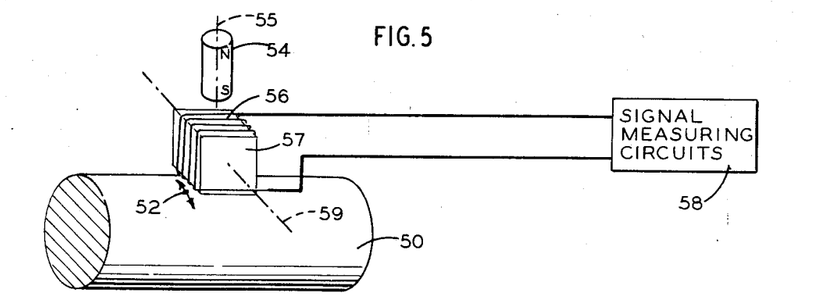
FIG. 5 is a schematic representation of a device for measuring tangential components of motion caused by a torsional mode of vibration.

Referring to FIG. 5, a vibrating cylindrical bar 50 has a torsional component of motion, which is a type of tangential motion, as indicated by the double headed arrow 52. The eddy current pickup device is schematically shown to include a polarizing magnet 54, polarized as shown and having an axis 55 which is perpendicular to the longitudinal axis of the bar 50, and a pickup coil which is wound around a ferrite core 57 as shown. The ferrite core 57 is positioned contiguous to the surface of the bar 50. The voltage induced in pickup coil 56 by the eddy currents on the surface of the bar 50 is directly proportional to the amount of displacement due to the motion 52. The pickup coil 56 is connected to a conventional signal measuring circuit 58. This device is identical to the device shown in FIG. 3, except that the coil of wire 56 is oriented so as to sense the torsional type of tangential motion. In order for this device to sense the entire torsional component of motion 52, it is necessary that the magnetic axis 59 of the coil of wire 56 be parallel to the component of motion 52 being measured.

Figure 6:
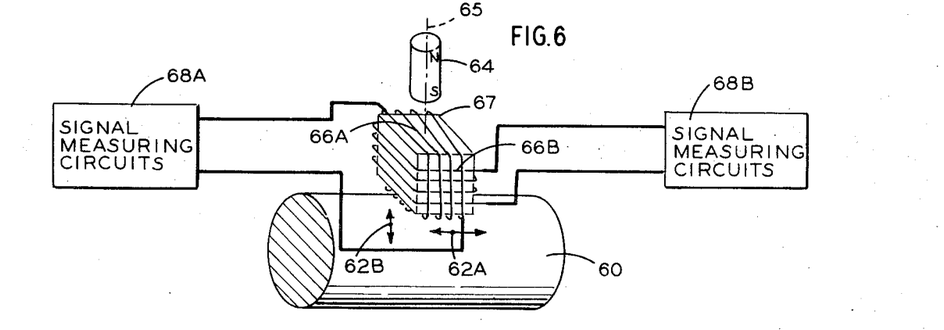
FIG. 6 is a schematic representation of a device which independently but simultaneously measures tangential and normal components of motion.

Referring to FIG. 6, a vibrating cylindrical bar 60 has a tangential and a normal component of motion as indicated by the double headed arrows 62A and 62B. The eddy current pickup device schematically shown is designed to simultaneously but independently sense the tangential component 62A and the normal component 62B. This device essentially combines the devices of FIGS. 3 and 4, using only one ferrite core. Included is a polarizing magnet 64, polarized as shown and having an axis 65 which is perpendicular to the longitudinal axis of the bar 60, and two pickup coils 66A and 66B wound around a ferrite core 67 as shown. The ferrite core 67 is positioned contiguous to the surface of the bar 60. The voltage induced in pickup coil 66A by the eddy currents on the surface of the bar 60 is directly proportional to the amount of displacement due to the tangential component of motion 62A. The pickup coil 66A is connected to a conventional signal measuring circuit 68A. Similarly the voltage induced in coil 66B is directly proportional to the amount of displacement due to the normal component of motion 62B. The pickup coil 66B is connected to a conventional signal measuring circuit 68B.

Figure 7:
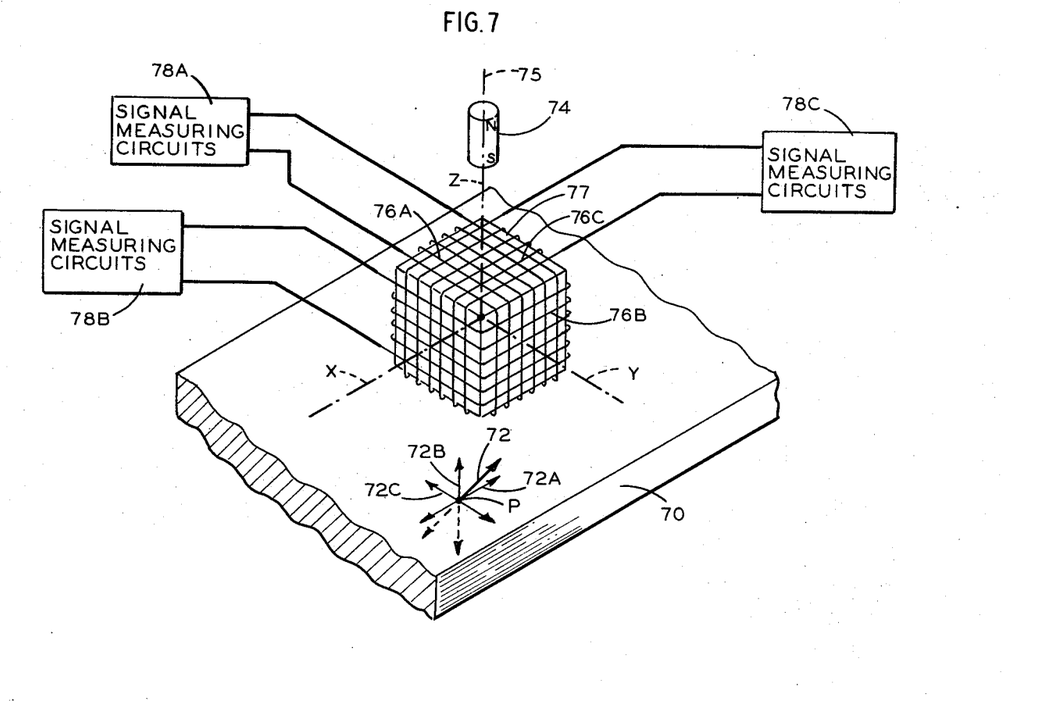
FIG. 7 is a schematic representation of a device which independently but simultaneously measures two tangential components of motion and one normal component of motion.

Referring to FIG. 7, there is shown an eddy current device which independently and simultaneously senses three components of motion. A body 70 having a plane surface is vibrated in an oscillatory manner resulting in the motion indicated by the double headed arrow 72. In general, the velocity vector of any point on the surface at any instant of time can be resolved into its three orthogonal components. In an $x$-$y$-$z$ coordinate system, as shown, the motion in the $x$-direction is indicated by the double headed arrow 72A, the motion in the $y$-direction is indicated by the double headed arrow 72C and the motion in the $z$-direction is indicated by the double headed arrow 72B. The eddy current pickup device is schematically shown to include a polarizing magnet 74, polarized as shown and having an axis 75 which is perpendicular to the surface of the body 70, and three pickup coils 76A, 76B and 76C which are wound around a ferrite core 77 as shown. The ferrite core 77 is positioned contiguous to the surface of the body.

Each coil is wound in a different plane, the three planes being mutually perpendicular to each other. The voltage induced in pickup coil 76A by the eddy currents on the surface of the bar 70 is directly proportional to the amount of displacement due to the tangential component of motion 72A. The pickup coil 76A is connected to a conventional signal measuring circuit 78A. The same is true for the motion 72B as it relates to the signal measuring circuit 78B and for the motion 76C as it relates to the signal measuring circuit 78C. The phase differences of all the three components may be obtained by electrically linking the signal measuring circuits 78A, 78B and 78C.

The embodiment shown in FIG. 7 can also be used as a vector probe. In all of the prior embodiments it was necessary to angularly orient the ferrite cube until the maximum signal was obtained on the pickup coil. This is unnecessary with the three coil configuration of FIG. 7. The following analysis is based on the assumption that there is no phase difference between the individual components. If $V_t$ is the resultant of components 72A and 72C then:

$$|V_t| = \sqrt{(V_{72A})^2 + (V_{72C})^2} \quad (1)$$

and $$\tan \alpha = V_{72A}/V_{72C} \quad (2)$$

where $\alpha$ is the angle between $V_{72C}$ and $V_t$. The magnitude and direction of the resultant velocity V can be further calculated as follows:

$$|V| = \sqrt{(V_{72A})^2 + (V_{72B})^2 + (V_{72C})^2} \quad (3)$$

and $$\tan \beta = V_{72B}/V_t \quad (4)$$

where $\beta$ is the angle between $V_t$ and $V$. When there is a phase difference, elliptical or circular motion results and the equations become more complicated. Discussion of such conditions can be found in "Method for Analyzing Vibration at a Surface Point" by Arnold and Martnet — Review of Scientific Instruments, 1958, Vol. 29, pages 779–783.

Up to now, discussion has centered around a vibrating body whose amplitude of vibration is measured anywhere on its surface and regardless of whether or not the body is coupled to a load. However, when a dissipative load is coupled to a vibrating body it is often necessary to know how much acoustic power is being transmitted through the body. In the case of a resonating body, the source of vibrations give rise to what is usually referred to as a standing wave. However, when a dissipative load is coupled to the resonating body, an additional wave commonly referred to as a progressive or traveling wave results.

With respect to a resonating body which is vibrated along one of its axis, such as a longitudinal axis, there are points, commonly referred to as nodes, where there is no motion. Since the vibration is primarily in the direction of the longitudinal axis, these points will be hereinafter referred to as nodes of longitudinal motion. Also halfway between each pair of nodal points is a portion commonly referred to as a loop or antinode at which the amplitude of longitudinal motion is the greatest. Again since the vibration is primarily in the direction of the longitudinal axis, these points will be hereinafter referred to as loops of longitudinal motion. A more thorough discussion of these terms can be found in a basic text, such as "Vibration & Sound" by P. M. Morse (2nd Edition 1948) pages 83 & 84.

The following discussion involves a transmission line in the form of a elongated bar vibrated along its longitudinal axis with the source of vibration connected to the driving point or input end of the bar and a dissipative load connected to the loading point or output end of the bar. For the sake of simplicity, the impedance of the load will be assumed to be purely resistive in nature, which means that the force and velocity at the output end are assumed to be in phase. Also, unless otherwise specified, the mechanical load impedance $r$ will be assumed to be less than the impedance $z$ of the transmission line. This is the more common case and it means that the stress generated by the progressive or traveling wave is smaller than the stress generated by the standing wave.

In general, it may be said that the power transmitted along the longitudinal axis is equal to the force in the longitudinal direction at any point times the velocity in the longitudinal direction at the same point times the phase angle between the velocity and the force. In considering amplitudes of force and velocity, this may be written in equation form as:

$$P = \tfrac{1}{2} F_A V_A \cos\phi \qquad (5)$$

Where:
 $P$ = power transmitted along the transmission line
 $F_A$ = axial force amplitude at any position $x$ on a longitudinal axis.
 $V_A$ = axial velocity amplitude at the same position $x$ on the longitudinal axis.
 $\phi$ = phase angle between $V_A$ and $F_A$. However, the signal measuring circuits of the eddy current devices described above with reference to the drawings may only be used to calculate the velocity at a point as expressed by the equation:

$$V_x = \gamma E_x \qquad (6)$$

Where:
 $E_x$ = induced voltage at any point $x$
 $V_x$ = velocity at same point $x$
 $\gamma$ = calibration constant Therefore, it is necessary that all power equations be expressed only in terms of velocity components to use the eddy current devices described above.

Without going through the detailed steps, equation (5) can be changed in form to read:

$$P = \tfrac{1}{2} F_A V_A \cos\varphi = \frac{Z}{2\nu\alpha_r} V_A V_R \cos(\varphi + \delta) \qquad (7)$$

Where:
 $V_R$ = radial velocity amplitude
 $Z$ = impedance of transmission line = $\rho cS$
 $\rho$ = density of material
 $c$ = longitudinal sound velocity for the particular material
 $S$ = cross-sectional area
 $\nu$ = Poisson's ratio for the material of the transmission line
 $\alpha_v$ = $Wa/c$, where $W = 2\pi f$ and $a$ is the radius of cylindrical transmission line.
 $\delta$ = constant phase angle between $V_A$ and $V_R$, which depends on the parameters of the transmission line and on the frequency.

With the pickup device illustrated in FIG. 6, and a phase meter, the power transmitted can be calculated according to equation (7), if the frequency is known.

It can also be shown that the transmitted power along the longitudinal axis is proportional to the product of two axial velocities measured at two locations along the transmission line, or is proportional to the product of two radial velocities measured at two locations along the transmission line, or is proportional to the product of one axial velocity and one radial velocity measured at two locations along the transmission line. In equation form this may be written as follows:

$$P = \tfrac{1}{2} K V_{A1} V_{A2} \qquad (9)$$

$$P = \tfrac{1}{2} K' V_{R1} V_{R2} \qquad (10)$$

$$P = \tfrac{1}{2} K'' V_{A1} V_{R2} \qquad (11)$$

Figure 8:
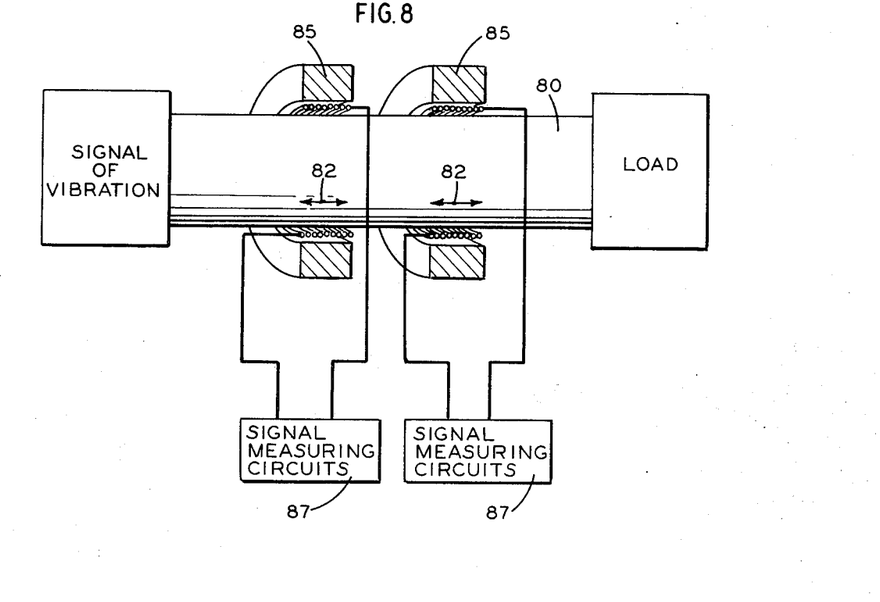
FIG. 8 is a schematic representation of a mechanical wattmeter using two eddy current pickup devices of the type similar to that illustrated in FIG. 1.

The coefficients $K$, $K'$, $K''$ depend on the parameters of the transmission bar and on the position of the two pickups relative to the standing wave. Under stationary conditions one may make two separate measurements applying one pickup device to two different positions along the X-axis of the bar. However, it is more practical to apply simultaneously a pair of pickups as shown in FIG. 8. In principle, the pickups may be arbitrarily positioned anywhere along the bar, excluding those positions where the pickups would generate identical signals. However, for the sake of precision and mathematical simplicity, it is preferable to space the pickups so as to have them operating at the loops or nodes of longitudinal motion. The vibration frequency should be held constant during the measurement. If the frequency is also to vary then it has to be included in the measurement and the power calculation becomes more complicated.

Referring back to equation (5), at the loading point ($x=0$), where the phase angle is 0° due to the resistive load:

$$P_{x=0} = \tfrac{1}{2} F_o V_o \qquad (12)$$

Since the load is acting at the loading point ($x=0$), then by definition its mechanical impedance $r$ is:

$$r = F_o/V_o \qquad (13)$$

Hence, equation (12) may be rewritten in other forms, namely:

$$P_{x=0} = \tfrac{1}{2} r V_o^2 \qquad (14)$$

$$P_{x=0} = \tfrac{1}{2}(F_o^2/r) \qquad (15)$$

However, since it is not always possible to sense $V_o$, it is desirable to express the power in terms of the velocity measured at points other than at the loading point. In the case of a nonabsorbing bar having a homogeneous cross section along its length, the wave distribution is periodic and repeats every half wavelength. Since the loading point is at a loop of longitudinal motion of the standing wave, the values of the axial components of $F$ and $V$ at other loops along the length of the bar will be equal to $F_o$ and $V_o$ respectively. The terms loop and node as used throughout this description are used to describe the loop and node of the longitudinal standing wave. Loops of motion will occur at points $x = n\lambda/2$ where $n = 0, 1, 2, 3$ and nodes will occur at points $x = (2n-1)(\lambda/4)$ where $n = 1, 2, 3$. For the case of $r < z$ as postulated above, the maximum axial velocity will occur at the loops and the minimum axial velocity will occur at the nodes.

For a purely resistive load it is known from transmission line theory that:

$$V_A = V_o \sqrt{\cos^2\left(\frac{\omega x}{c}\right) + \frac{r^2}{z^2}\sin^2\left(\frac{\omega x}{c}\right)} \qquad (16)$$

$$F_A = zV_o \sqrt{\sin^2\left(\frac{\omega x}{c}\right) + \frac{r^2}{z^2}\cos^2\left(\frac{\omega x}{c}\right)} \qquad (17)$$

The first case to consider involves two axial components of velocity, one measured at a loop and one measured at a node. From above it is known that:

$$V_A \max. = V_o \qquad (18)$$

For the fundamental frequency, the node is at $x = \lambda/4$, where $\mu$ is the wavelength at the particular frequency. Substituting this into equation (16) results in:

$$V_A \min. = (rV_0)/z \quad (19)$$

Forming the product of $V_A$ max. and a $V_A$ min. from equations (18) and (19) respectively, results in an expression which is proportional to the transmitted power $P$ of equation (14)

$$(V_A \max.)(V_A \min.) = (rV_0^2)/z \quad (20)$$

In comparing equations (20) and (14), it can be seen that:

$$P = (\tfrac{1}{2}) z V_A \max. V_A \min. \quad (21)$$

Therefore, by positioning a pickup device which senses the axial velocity at a loop and another pickup device which senses the axial velocity at a node, a device which measures transmitted mechanical power is obtained. Such a power measuring device is schematically shown in FIG. 8.

Referring to FIG. 8, a vibrating cylindrical bar 80 has an axial component of motion, which is a type of tangental motion as indicated by the double headed arrow 82. The calibrated eddy currentpickup devices 85-85 are of the type already discussed in more detail with reference to FIG. 1. The voltage output of the devices which will appear on the signal measuring circuits 87—87 may be used to calculate the desired velocities as already discussed with reference to equation (6). These devices will only sense the axial or tangential components of motion. One is placed at a loop and the other is placed at a node. The device 85 at the loop will sense $V_A$ max. which is associated with the standing wave and the device 85 at the node will sense $V_A$ min. which is associated with the progressive or traveling wave due to the dissipative load. Of course, a tangential pickup device of the type discussed in more detail with reference to FIG. 3, could also be used in lieu of the devices 85—85.

The second case to consider involves two radial components of velocity, one measured at a loop of longitudinal displacement and one measured at a node of longitudinal displacement. When a body is vibrated longitudinally radial vibrations also arise due to the Poisson effect. These radial components of vibration are proportional to the axial stress in the bar and thus to the axial force. First it is necessary to rewrite the above equation in terms of radial (as opposed to axial) components. For a bar having a relatively small radius and having a uniform axial strain, it is safe to assume that the radial strain is constant across the radius and that the radial motion is proportional to the radius. Then, from general principles of mechanics and strength of materials it can be shown that the radial component ($V_R$) of velocity at any point $x$ along the bar is:

$$V_R = (vWaF_A)/(ES) \quad (22)$$

where:
- $v$ = Poisson's ratio for the material of the bar
- $\omega$ = angular frequency at which the bar is vibrating
- $a$ = radius of the bar
- $F_A$ = axial force at the point $x$
- $E$ = Young's Modulus for the material of the bar
- $S$ = cross sectional area of the bar For a bar whose diameter is small in comparison to the wavelength, it is also known that:

$$E = \rho c^2 \quad (23)$$

where:
- $\rho$ = density of material
- $c$ = longitudinal sound velocity for the particular material Substituting equations (8), (17) and (23) into equation (22) results in:

$$V_R = v\left(\frac{\omega a}{c}\right) V_0 \sqrt{\sin^2\left(\frac{\omega x}{c}\right) + \frac{r^2}{z^2}\cos^2\left(\frac{\omega x}{c}\right)} \quad (24)$$

In the case of the above postulated condition, namely $r<z$ $V_R$ at a loop of longitudinal displacement is a minimum and is caused by the progressive or traveling wave due to the dissipative load. One such loop occurs at the loading point $x=0$ which when substituted into equation (24) results in:

$$V_{R \min.} = \frac{v\omega ar}{cz} V_0 \quad (25)$$

Also, $V_R$ at a node of longitudinal displacement is a maximum and is caused by the standing wave.

For the fundamental frequency, the node is at $x = \lambda/4$ Substituting this value for $x$ into equation (24) results in:

$$V_{R \max.} = \frac{v\omega a}{c} V_0 \quad (26)$$

Forming the product of $V_R$ max. and $V_R$ min. from equations (26) and (25) respectively, results in an expression which is proportional to the transmitted power $P$ of equation (14)

$$V_{R \max.} V_{R \min.} = \frac{r}{z}\left(\frac{v\omega a}{c} V_0\right)^2 \quad (27)$$

In comparing equations (27) and (14) it can be seen that:

$$P = \frac{z}{2}\left(\frac{c}{v\omega a}\right)^2 V_{R \max.} V_{R \min.} \quad (28)$$

For a more general expression that is not limited to a cylindrical bar nor to a relatively small bar diameter equation (28) could be written:

$$P = kz\left(\frac{c}{v\omega}\right)^2 V_{R \max.} V_{R \min.} \quad (29)$$

where $k$ is a constant determined by the particular shape. Substituting the expression for the impedance $z$ from equation (8) and the expression for a circular cross section into equation (28) results in:

$$P = \frac{\pi}{2}\frac{\rho c^3}{\omega^2 v^2} V_{R \max.} V_{R \min.} \quad (30)$$

Therefore, by positioning a pickup device which senses the radial velocity at a loop of longitudinal displacement and another pickup device which also senses the radial velocity at a node of longitudinal displacement, a mechanical wattmeter which measures transmitted power is obtained. Such a wattmeter is schematically shown in FIG. 9.

Figure 9:
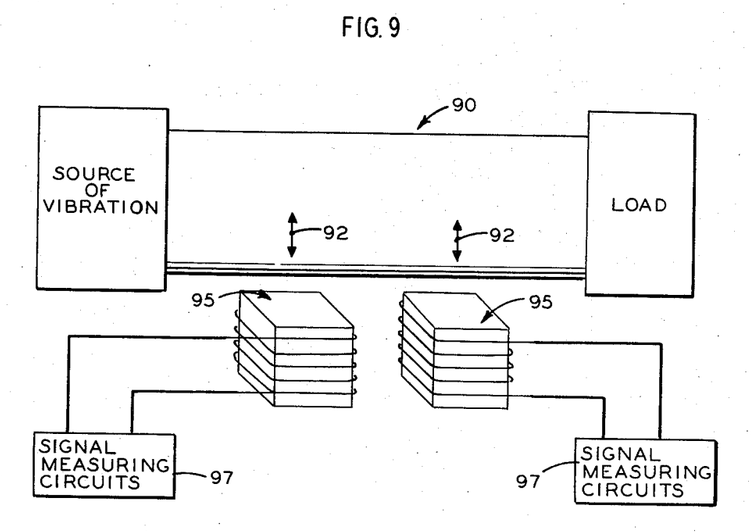
FIG. 9 is a schematic representation of a mechanical wattmeter using two eddy current pickup devices of the type similar to that illustrated in FIG 4.

Referring to FIG. 9, a vibrating cylindrical bar 90 has a radial component of motion, which is a type of normal motion, as indicated by the double headed arrow 92. The calibrated eddy current pickup devices 95—95 are of the type already discussed in more detail with reference to FIG. 4. These devices will only sense the normal components of motion (in the radial direction). One is placed at a loop of longitudinal displacement. Since according to equation (6) the velocity is proportional to the output voltage, $V_R$ max. and $V_R$ min. are obtained from the signal measuring circuits 97—97. For the postulated condition of $r<z$, the device 95 at the loop will sense $V_R$ min. which is associated with the progressive or traveling wave due to the dissipative load and the device 95 at the node will sense $V_R$ max. which is associated with the standing wave.

The third and fourth cases to consider involve the axial and the radial components of velocity, both of which are measured either at a loop of longitudinal displacement or at the node of longitudinal displacement. Again, the postulated condition of $r<z$ will be considered throughout. First, measurement at the loop will be considered.

$V_R$ at a loop is $V_R$ min. and caused by the progressive or traveling wave due to the dissipative load. This has already been derived (see equation 25). $V_A$ at a loop is $V_A$ max., is caused by the standing wave, and as already stated in equation (18) is $V_o$.

Forming the product of $V_R$ min. and $V_A$ max. from equations (25) and (18) respectively, results in an expression which is proportional to the transmitted power $P$ of equation (14).

$$(V_{A\,max.})(V_{R\,min.}) = \frac{\nu \omega a r}{cz} V_o^2 \qquad (31)$$

In comparing equations (31) and (14) it can be seen that:

$$P = \frac{1}{2}\frac{cz}{\nu\omega a} V_{A\,max.} \cdot V_{R\,min.} \qquad (32)$$

Substituting the expression for the impedance $z$ from equation (8) and the expression for a circular cross-section into equation (32) results in:

$$P = \frac{\pi}{2}\frac{\rho a c^2}{\nu\omega} V_{A\,max.} \cdot V_{R\,min.} \qquad (33)$$

For the fourth case, measurement at a node of longitudinal displacement of both components of the velocity will be considered. $V_R$ at a node is $V_R$ max. and caused by the standing wave. This has already been derived (see equation 26).

$V_A$ at a node is $V_A$ min. and caused by the progressive or traveling wave due to the dissipative load. This has already been derived (see equation 19).

Forming the product of $V_R$ max. and $V_A$ min. from equations (26) and (19) respectively, results in an expression which is proportional to the transmitted power $P$ of equation (14).

$$(V_{R\,max.})(V_{A\,min.}) = \frac{\nu \omega a r}{cz} V_o^2 \qquad (34)$$

In comparing equations (34) and (14) it can be seen that:

$$P = \frac{1}{2}\frac{cz}{\nu\omega a} V_{R\,max.} \cdot V_{A\,min.} \qquad (35)$$

Substituting the expression for the impedance $z$ from equation (8) and the expression for a circular cross-section into equation (35) results in:

$$P = \frac{\pi}{2}\frac{\rho a c^2}{\nu\omega} V_{R\,max.} \cdot V_{A\,min.} \qquad (36)$$

Therefore, by positioning a pickup device which simultaneously but independently senses both components of motion, at a node or loop of longitudinal displacement, a mechanical wattmeter which measures transmitted power is obtained. Such a wattmeter is schematically shown in FIG. 10.

Figure 10:
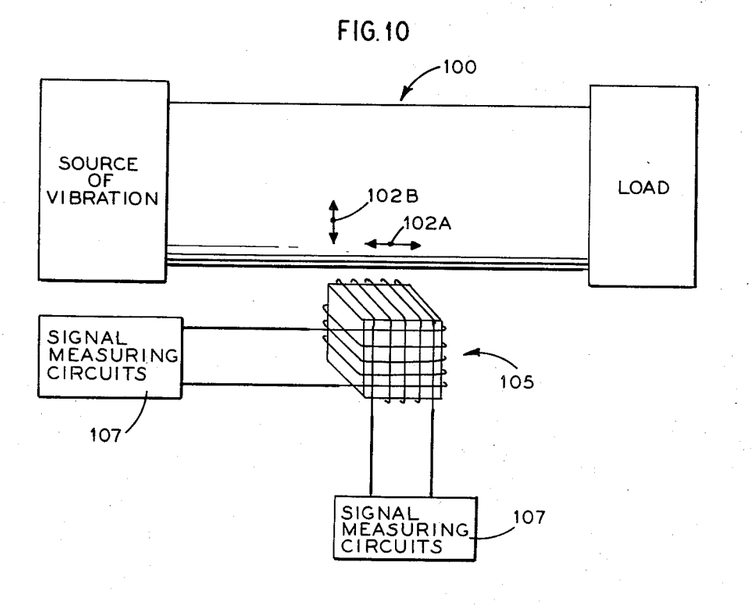
FIG. 10 is a schematic representation of a mechanical wattmeter using an eddy current pickup device of the type illustrated in FIG. 6.

Referring to FIG. 10, a cylindrical bar 100 is longitudinally vibrated in an oscillatory manner resulting in two components of motion as indicated by the double headed arrows 102a and 102b. The eddy current pickup device 105 is of the type already discussed with reference to FIG. 6. Since according to equation (6) the velocity is proportional to the output voltage, the values of $V_A$ max. and $V_R$ min. necessary for equation (33) and the values of $V_R$ max. and $V_A$ min. necessary for equation (36) are obtained from the signal measuring circuits 107—107 depending upon whether the pickup device is positioned at a loop or at a node of longitudinal displacement.

Without going through the derivations thereof, the following equation can be used to calculate the power transmitted by a bar being vibrated in a torsional node of vibration.

$$P = (\pi/4)\sqrt{a^2\,\rho G}\, V_{Tmax.} \cdot V_{Tmin.} \qquad (37)$$

where:

$G$ = bulk modulus of the material $V_T$ max. = the maximum torsional component of velocity $V_T$ min. = the minimum torsional component of velocity Readings proportional to $V_T$ max. and $V_T$ min. may be obtained by positioning the pickup devices of FIG. 5 at a loop and at a node of torsional vibration.

As stated above, all of the above equations were developed for the more common condition of $r<z$. In the case of $z<r$, which means that the force generated by the traveling wave is greater than the force generated by the standing wave, the only thing that would change is that the maximum and the minimum values of the axial, radial and torsional components of velocity would have to be interchanged.

The above-described embodiments of the invention are intended to be merely exemplary, and those skilled in the art will be able to make numerous variations and modifications of it without departing from the spirit and scope of the invention. All such variations and modifications are intended to be included within the scope of the invention as defined in the appended claims.

What is claimed is:

1. A device for sensing axial movements of a vibrating elongated body having a longitudinal axis comprising, magnet means shaped to conform to the entire periphery of said body and magetized radially, relative to said longitudinal axis, said magnet means being positioned near the vibrating surface to supply a constant magnetic field thereto, whereby eddy currents are induced on the surface of the vibrating body, coil means for sensing a varying magnetic field caused by said eddy currents and positioned adjacent to the induced eddy currents, said coil being contiguous to a small area of said surface and being solenoidally wound about the entire periphery of said body, and means electrically coupled to said coil means for measuring the voltage induced by said varying magnetic field.

2. A device in accordance with claim 1, further inducing at least one pole piece positioned in the flux path of the magnet means.

3. A device for sensing the radial component of motion of a vibrating elongated body having a longitudinal axis comprising, magnet means shaped to conform to the entire periphery of said body and magnetized in the direction of the longitudinal axis, said magnetic being positioned near the vibrating surface to supply a constant magnetic field thereto, wherein eddy currents are induced on the surface of the vibrating body, at least one pole piece which is positioned in the flux path of the constant magnetic field resulting in flux lines which are substantially parallel to said longitudinal axis but substantially perpendicular to the component of motion being measured, coil means for sensing a varying magnetic field caused by said eddy currents and positioned adjacent to the induced eddy currents, said coil being contiguous to a small area of said surface and being wound about the entire periphery of said body, and means electrically coupled to said coil means for measuring the voltage induced by said varying magnetic field.

4. A device for sensing components of motion of a vibrating body comprising, means for supplying a constant magnetic field to said body surface, said magnetic field having components substantially perpendicular to the components of motion being measured, wherein eddy currents are induced on the surface of the vibrating body, a body of high permeability positioned contiguous to a small area of said body surface and adjacent to the induced eddy currents, first coil means for sensing a varying magnetic field caused by said eddy currents, said coil being wound about said high-permeability body, the axis of said winding being parallel to one component of motion being measured, second coil means for sensing a varying magnetic field caused by said eddy currents, said coil being wound about said high-permeability body, the axis of said winding being perpendicular to the axis of said first coil means and being parallel to another component of motion being measured, first means electrically coupled to said first coil means for measuring the voltage induced by said varying magnetic field, and second means electrically coupled to said second coil means for measuring the voltage induced by said varying magnetic field.

5. A device for sensing components of motion of a vibrating body comprising, means for supplying a constant magnetic field to said body surface, said magnetic field having components substantially perpendicular to the components of motion being measured, wherein eddy currents are induced on the surface of the vibrating body, a body of high permeability positioned contiguous to a small area of said body surface and adjacent to the induced eddy currents, first coil means for sensing a varying magnetic field caused by said eddy currents, said coil being wound about said high-permeability body, the axis of said winding being parallel to one component of motion being measured, second coil means for sensing a varying magnetic field caused by said eddy currents, said coil being wound about said high-permeability body, the axis of said winding being perpendicular to the axis of said first coil means and being parallel to another component of motion being measured, third coil means for sensing a varying magnetic field caused by said eddy currents, said coil being wound about said high-permeability body, the axis of said winding being perpendicular to the axis of the said first and second coil means and being parallel to the third component of motion being measured, first means electrically coupled to said first coil means for measuring the voltage induced by said varying magnetic field, second means electrically coupled to said second coil means for measuring the voltage induced by said varying magnetic field, and third means electrically coupled to said third coil means for measuring the voltage induced by said varying magnetic field.

6. A meter for measuring the power transmitted by an acoustic signal to a dissipative load coupled to one end of a longitudinally vibrated bar, wherein said acoustic signal causes said bar to vibrate, comprising, a first eddy current device positioned at a first point along the longitudinal axis of said bar to measure one component of motion of vibration of said bar, and a second eddy current device positioned at a second point along the longitudinal axis of said bar to measure another component of motion of vibration of said bar, with the magnitude of the two measurements being different and said measurements being used to calculate the transmitted power.

7. A meter in accordance with claim 6, wherein both devices are designed to measure the tangential components of motion and said first point is a point of maximum longitudinal amplitude of motion and said second point is a point of minimum longitudinal amplitude of motion.

8. A meter in accordance with claim 7, wherein the first point is a loop of longitudinal motion and the second point is a node of longitudinal motion.

9. A meter in accordance with claim 6, wherein both devices are designed to measure the normal components of motion and said first point is a point of maximum normal amplitude of motion and said second point is a point of minimum normal amplitude of motion.

10. A meter in accordance with claim 9, wherein the first point is a node of longitudinal motion and the second point is a loop of longitudinal motion.

11. A meter for measuring the power transmitted by an acoustic signal to a dissipative load coupled to one end of a bar having a longitudinal axis wherein said acoustic signal causes said bar to longitudinally vibrate, comprising,
- a first eddy current device positioned at a point along the longitudinal axis of said bar to measure a first component of motion of vibration of said bar, and
- a second eddy current device positioned at the same point as said first device to measure a second component of motion of vibration of said bar, said second component being orthogonal to said first component.

12. A meter in accordance with claim 11, wherein said first eddy current device is designed to measure the tangential component of motion and said second eddy current device is designed to measure the normal component of motion.

13. A meter in accordance with claim 12, wherein both devices are positioned at a loop of longitudinal displacement.

14. A meter in accordance with claim 12, wherein both devices are positioned at a node of longitudinal displacement.

15. A meter for measuring the power transmitted by an acoustic signal to a dissipative load coupled to one end of a bar having a longitudinal axis, wherein said acoustic signal causes said bar to longitudinally vibrate, comprising,
- a first eddy current device positioned at a loop of longitudinal vibrational motion of said bar to measure the tangential component of motion at said loop further including,
    - first magnet means, shaped to conform to the periphery of said bar and magnetized radially, relative to the longitudinal axis, said magnet being positioned near the vibrating surface to supply a constant magnetic field thereto,
    - first coil means for sensing a varying magnetic field caused by self-induced eddy currents on the vibrating surface, said coil being contiguous to a small area of said surface and being wound about the periphery of said body, and
    - a first means electrically coupled to said first coil means for measuring the voltage induced by said varying magnetic field; and
- a second eddy current device positioned at a node of longitudinal vibrational motion of said bar to measure the tangential component of motion at said node, further including,
    - second magnet means, shaped to conform to the periphery of said bar and magnetized radially, relative to the longitudinal axis, said magnet being positioned near the vibrating surface to supply a constant magnetic field thereto,
    - second coil means for sensing a varying magnetic field caused by self-induced eddy currents on the vibrating surface, said coil being contiguous to a small area of said surface and being wound about the periphery of said body, and
    - second means electrically coupled to said coil means for measuring the voltage induced by said varying magnetic field,
- whereby the measurements of both eddy current devices are used to calculate the transmitted power.

16. A meter for measuring the power transmitted by an acoustic signal to a dissipative load coupled to one end of a bar having a longitudinal axis, wherein said acoustic signal causes said bar to longitudinally vibrate, comprising,
- a first eddy current device positioned at a loop of longitudinal vibrational motion of said bar to measure one component of motion at said loop, further including,
    - a first means for supplying a constant magnetic field to said bar surface, one component of said magnetic field being substantially perpendicular to the component of motion being measured,
    - a first body of high permeability positioned contiguous to a small area of said body surface,
    - first coil means for sensing a varying magnetic field caused by self-induced eddy currents on the vibrating surface, said coil being wound about said first high-permeability body, the axis of said winding being parallel to the component of motion being measured, and
    - first means electrically coupled to said first coil means for measuring the voltage induced by said varying magnetic field; and
- a second eddy current device positioned at a node of longitudinal vibrational motion of said bar to measure the same component of motion as measured by the first eddy current device, further including,
    - a second means for supplying a constant magnetic field to said bar surface, one component of said magnetic field being substantially perpendicular to the component of motion being measured,
    - a second body of high permeability positioned contiguous to a small area of said body surface,
    - a second coil means for sensing a varying magnetic field caused by self-induced eddy currents on the vibrating surface, said coil being wound about said second high-permeability body, the axis of said winding being parallel to the component of motion being measured, and
    - second means electrically coupled to said second coil means for measuring the voltage induced by said varying magnetic field,
- whereby the measurements of both eddy current devices are used to calculate the transmitted power.

17. A meter for measuring the power transmitted by an acoustic signal to a dissipative load coupled to one end of a bar having a longitudinal axis, wherein said acoustic signal causes said bar to longitudinally vibrate, comprising,
- an eddy current device positioned somewhere along the longitudinal axis of said resonating bar, further including,
    - means for supplying a constant magnetic field having components substantially perpendicular to the components of vibrational motion being measured,
    - a body of high permeability positioned contiguous to a small area of said body surface,
    - first coil means for sensing a varying magnetic field caused by self-induced eddy currents on the vibrating surface, said coil being wound about said high-permeability body, the axis of said winding being parallel to one component of motion being measured, second coil means for sensing a varying magnetic field caused by said self-induced eddy currents on the vibrating surface, said coil be wound about said high-permeability body, the axis of said winding being perpendicular to the axis of said first coil means and being parallel to another component of motion being measured, first means electrically coupled to said first coil means for measuring the voltage induced by said varying magnetic field, and second means electrically coupled to said second coil means for measuring the voltage induced by said varying magnetic field, whereby the measurements of both coil means are used to calculate the transmitted power.

18. A meter in accordance with claim 17, wherein the eddy current device is positioned at a loop of longitudinal motion.

19. A meter in accordance with claim 17, wherein the eddy current device is positioned at a node of longitudinal motion.

* * * * *